United States Patent Office 3,491,126
Patented Jan. 20, 1970

3,491,126
SULFONATED 1-ALKYLAMINO-4-TOLYLAMINO-ANTHRAQUINONES
Hans Rudolf Schwander, Riehen, Anton Zenhausern, Reinach, Basel-land, and Peter Hindermann, Bottmingen, Switzerland, assignors to J. R. Geigy A.G., Basel, Switzerland
No Drawing. Filed Dec. 17, 1965, Ser. No. 514,702
Claims priority, application Switzerland, Dec. 21, 1964, 16,422/64; Mar. 3, 1965, 2,938/65
Int. Cl. C09b 1/28, 1/34
U.S. Cl. 260—374
3 Claims

ABSTRACT OF THE DISCLOSURE

Dyestuffs, which in their free acid form are of the formula:

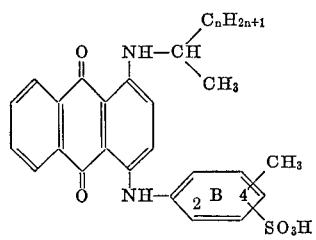

wherein $n$ represents 1 or 2, are particularly useful for the dyeing and printing of synthetic or natural polyamide fibers.

---

The present invention concerns new acid anthraquinone dyestuffs, processes for their production, their use for the dyeing and printing of synthetic or natural polyamide fibers as well as, as industrial product, the fiber material dyed and printed therewith.

For certain purposes in wool dyeing there is a great need for dyestuffs which have good equalizing and migrating powers. But in many cases in practice these properties are found only in conjunction with insufficient wet fastness properties; in particular, up to the present there has been a lack of brilliant blue dyestuffs of the anthraquinone series which, while having good migrating and levelling powers, are at the same time endowed with good fastness to wet media, i.e. possess wash fastness, fastness to water, perspiration, sea water, milling, etc.

It has now been found that wetfast dyestuffs which have good levelling and migrating powers and, in addition are excellently light fast and very brilliant, are obtained by reacting an anthraquinone compound of the formula

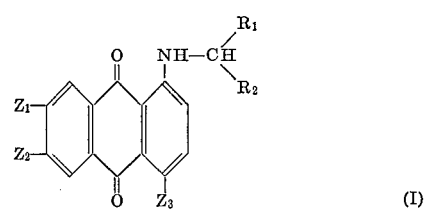

wherein:

each of $R_1$ and $R_2$ represents a lower alkyl group,
each of $Z_1$ and $Z_2$ represents hydrogen or halogen, and
$Z_3$ represents a substituent which can be exchanged for a phenylamino group, with a primary phenylamine containing at least one hydrogen atom in the nucleus which can be replaced, which phenylamine can be substituted by lower alkyl, lower alkoxy or lower alkanoylamino groups or by halogen or trifluoromethyl, and sulfonating the compound obtained to form an acid anthraquinone dyestuff of the formula:

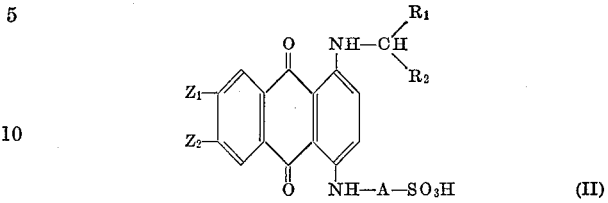

wherein:

A represents a phenylene radical which can be substituted by lower alkyl, lower alkoxy, lower alkanoylamino, trifluoromethyl or halogen, and
$R_1$, $R_2$, $Z_1$ and $Z_2$ have the meanings given in Formula I.

Lower alkyl groups in the position of $R_1$ and $R_2$ preferably contain 1 to 4 carbon atoms.

If $Z_1$ and $Z_2$ are halogens, then they are particularly chlorine or bromine.

In particularly valuable compounds of Formula II, $R_1$ is the methyl group, $R_2$ is the methyl or ethyl group and each of $Z_1$ and $Z_2$ is hydrogen.

$Z_3$ in Formula I represents, as halogen e.g. chlorine or bromine, furthermore the hydroxyl or a lower alkoxy group e.g. methoxy, or the nitro or amino group. Preferably $Z_3$ is, however, chlorine or bromine.

If the phenylene radical A in Formula II is substituted by lower alkyl or lower alkoxy groups, then these groups preferably contain 1 to 4 carbon atoms; if it is substituted by halogen then this is, particularly, fluorine, chlorine or bromine, the latter two being preferred.

Lower alkanoylamino groups falling under A have an alkanoyl moiety of preferably 2 to 4 carbon atoms, being e.g. propionylamino or, preferably, acetylamino.

When substituted the phenylene radical A may bear one, two or three of the above-mentioned substituents.

The starting materials of Formula I are obtained by known processes, e.g. by chlorinating, brominating or nitrating the corresponding 1-sec-alkyl-aminoanthraquinone compound and, if necessary, exchanging the chlorine or bromine atom in the 4-position for the hydroxyl or a lower alkoxy group, or reducing the nitro group to the amino group.

Starting compounds wherein $Z_3$ is the hydroxyl group can also be obtained by reacting 1,4-dihydroxy-anthraquinone, optionally admixed with its leuco compound, with the corresponding secondary alkylamine. They can also be used directly without isolation in the reaction to form the end product.

The reaction of the anthraquinone compound of Formula I with the phenylamine as defined above is performed, e.g. in solution or in the melt of an excess of the phenylamine or in an organic solvent not taking part in the reaction. Suitable solvents for this purpose are, e.g. aromatic hydrocarbons such as toluene, xylene or naphthalene, or halogenated or nitrated aromatic hydrocarbons such as chlorobenzene, di- or tri-chlorobenzenes or nitrobenzene, or halogenated aliphatic hydrocarbons such as trichloroethylene, furthermore, alcohols, e.g. lower alkanols such as n-butanol, secondary butanol or lower alkyleneglycol mono-lower alkyl ethers, e.g. ethylene glycol monomethyl or monoethyl ether, then aromatic hydroxy compounds, e.g. phenol and homologues thereof, or tertiary nitrogen bases such as pyridine.

If an anthraquinone compound of Formula I wherein $Z_3$ is halogen, particularly chlorine or bromine, is used as starting material, the reaction is advantageously performed in the presence of copper or a copper compound such as copper-(I) chloride, and also an acid buffering agent and, preferably, at a raised temperature.

As acid buffering agent, particularly an excess of the phenylamine as defined is used, optionally together with an alkali metal salt of a lower fatty acid or carbonic acid such as sodium or potassium acetate or sodium bicarbonate or sodium carbonate or an alkali hydroxide such as sodium, potassium hydroxide, or magnesium oxide.

The resulting 1-(N-secondary alkylamino)-4-phenylamino anthraquinones which are themselves blue disperse dyes are sulfonated by the usual methods, e.g. in concentrated sulfuric acid or in oleum, preferably having 0 to 9%, and optimally 2 to 8% $SO_3$ content, depending somewhat on the type of substituents at the phenylamino moiety under mild conditions, e.g. at room temperature; or with chlorosulfonic acid in a solvent not taking part in the reaction.

A first modification of the process according to the invention consists in reacting an anthraquinone compound of the formula:

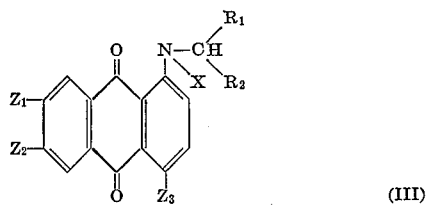

(III)

wherein X represents an acyl radical and $R_1$, $R_2$, $Z_1$, $Z_2$ and $Z_3$ have the meanings given above under Formula I, with a phenylamine having at least one replaceable hydrogen atom in the nucleus, which phenylamine can be substituted in the phenylnucleus by lower alkyl, lower alkoxy, lower alkanoylamino, trifluoromethyl and/or by halogen, and then, in any order, sulphonating and saponifying the 1 - (N - acyl-N-sec-alkylamino)-4-phenylamino anthraquinone compound obtained to form the dyestuff of Formula II.

X represents, for example, a carbacyl radical, particularly an alkanoyl radical, e.g. the formyl, acetyl or propionyl radical; an aroyl radical such as the benzoyl radical; an alkylsulfonyl radical such as the methylsulfonyl radical; or an arylsulfonyl radical such as the phenylsulfonyl or p-methyl-phenylsulfonyl radical. Preferably X is the acetyl radical.

The starting materials of Formula III are obtained by known methods, e.g. by reacting an anthraquinone compound of Formula I with the acylating agent introducing the radical X, mainly with acetyl chloride or bromide or with acetanhydride.

The reaction of the anthraquinone compounds of Formula III with the phenylamine as defined is performed as described in the first process. The resulting 1-(N-acyl-N-sec-alkyl-amino)-4-phenylamino anthraquinone compound is preferably first saponified and then sulfonated. Saponification is advantageously performed in aqueous acid medium, e.g. in aqueous sulfuric acid and advantageously at a raised temperature. The sulfonation is performed as described in the first process.

A second modification of the process according to the invention consists in reacting an anthraquinone compound of the formula

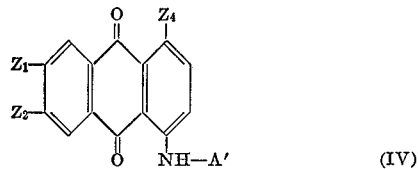

(IV)

wherein:
A' represents a phenyl radical having at least one hydrogen atom in the nucleus which can be replaced, which phenyl radical can be substituted by lower alkyl, lower alkoxy, lower alkanoylamino or trifluoromethyl or halogen, and $Z_4$ represents a radical which can be exchanged for an N-sec-alkylamino group which radical is a hydroxyl or lower alkoxy group, the amino or nitro group or especially chlorine or bromine, and $Z_1$ and $Z_2$ have the meanings given above, with a sec-alkylamine of the formula:

(V)

in which $R_1$ and $R_2$ have the same meaning as in Formula I and sulphonating the compound obtained to form the dyestuff of Formula II.

The remarks regarding the substituents of A given in the first process apply equally to any substituents of the phenyl radical A'.

The starting materials of Formula IV are known or can be produced by known methods, for example by reacting a 1-chloro- or 1-bromo- or 1-nitro-4-lower alkoxy anthraquinone with the desired phenyl amine of the formula A'—$NH_2$ and, if necessary, converting the chlorine or bromine into a lower alkoxy group or reducing the nitro group to the amino group.

Starting compounds of Formula IV wherein $Z_4$ is the hydroxyl group, can also be produced by reacting 1,4-dihydroxy anthraquinone, optionally in admixture with its leuco compounds, with the phenylamine of Formula A'—$NH_2$. They can be reacted directly without isolation to form intermediates which are then sulfonated to afford the end products of Formula II.

The reaction partners of Formulas IV and V are reacted preferably in the same way as described for the reaction of the anthraquinone compound of Formula I in the first process with the phenylamine there defined.

A third modification of the process according to the invention consists in reacting an anthraquinone compound of Formula VI

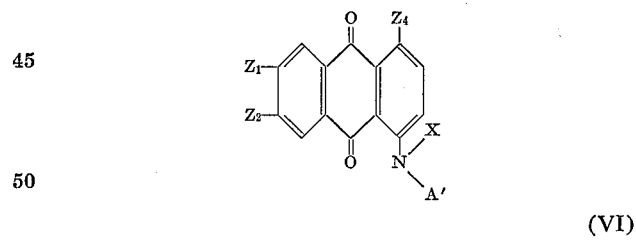

(VI)

wherein A', $Z_1$, $Z_2$ and $Z_4$ and X have the meanings given hereinbefore, with a sec-alkylamine of Formula V and then, in any order desired, sulphonating and saponifying the 1-(N-phenyl-N-acylamino)-4-sec-alkylamino-anthraquinone compound obtained to form the dyestuff of Formula II.

The starting materials of Formula VI are obtained by known methods, e.g., by reacting an anthraquinone compound of Formula IV with an acylating agent introducing the radical X, for instance, with acetyl chloride or bromide or, particularly, with acetanhydride.

The reaction of the anthraquinone compound of Formula VI with a sec-alkylamine of Formula V and the saponification of the resulting 1-(N-phenyl-N-acylamino)-4-sec-alkylamino anthraquinone compound are performed preferably analogously to the first modification of the process according to the invention. The sulfonation is performed as in the first process. Here too, it is advantageous to perform the saponification first and then the sulfonation.

The end products of Formula II are isolated advantageously as alkali metal salts, preferably as sodium salts, Acid anthraquinone dyestuffs to the invention but particularly those falling under the formula:

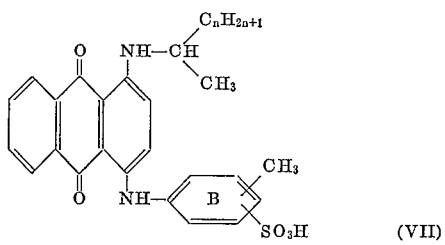

(VII)

wherein n represents 1 or 2, and among these, especially those dyestuffs in which the methyl group at the phenylamino moiety is in para- and the sulfo group in ortho-position to the —NH-bridge are suitable mainly for the dyeing and printing of synthetic polyamide fibers such as nylon or polyurethane fibers; natural polyamide fiber materials such as silk, leather and wool can also be dyed therewith. The dyestuffs according to the invention draw onto these fibers from a weakly acid to acid bath at higher temperatures very evenly and have good levelling and migratory powers. Blended fabrics of wool and nylon are dyed in surprisingly even shades. The dyeings so obtained are distinguished by particularly pure, greenish blue or blue shades having good lightfastness and particularly very good wash fastness and other wet fastness properties enumerated hereinbefore. The dyestuff according to the invention are also very well suited for admixture with other acid dyestuffs to attain dyeings in blended shades, especially green. A second aspect of the invention concerns another class of acid anthraquinone dyestuffs of the formula

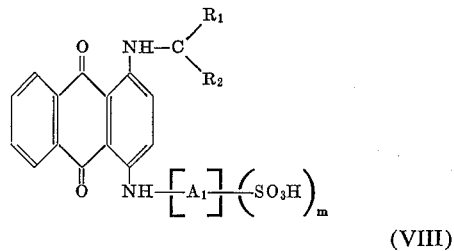

(VIII)

wherein:

$A_1$ represents the radical of an optionally further substituted diphenyl alkane, diphenyl cycloalkane, diphenyl ether or diphenyl thioether which is bound to the nitrogen by means of a carbon atom in the ring, and $R_1$ and $R_2$ each represents a lower, optionally substituted alkyl group, and m represents 1 or 2, but preferably about 1, and especially the preferred group of such dyestuffs which are of the formula

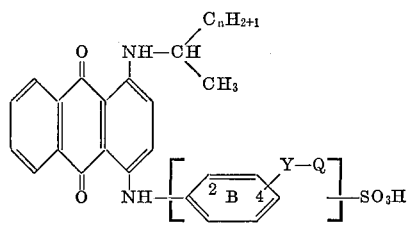

(IX)

wherein n represents 1 or 2,

Q represents phenyl, lower alkylphenyl, chlorophenyl or bromophenyl and

Y represents —O—, —S— or —CH$_2$—, are particularly suited for the dyeing and printing of fibrous material containing synthetic polyamide such as nylon, but also natural polyamides, e.g., wool or silk, and polyurethane fibers and, in particular, for dyeing nylon by the high temperature process. They draw onto these materials from an acid, aqueous bath very evenly and produce fast greenish blue, blue or reddish blue dyeings thereon which have good light fastness and wet fastness properties, especially fastness against perspiration, and nevertheless good equalizing power. Compared with 1-propylamino-anthraquinones of otherwise similar structure, their wool dyeings show unexpectedly improved light fastness.

Compared with similarly constituted dyestuffs of the first aspect of the invention, dyestuffs falling under Formula VIII and particularly those falling under Formula IX have similar good equalizing power on nylon and are distinguished therefrom by even better wet fastness, especially superior wash and water fastness and fastness to perspiration; coverage of bars or stripes in nylon dyeings is also especially satisfactory.

The dyestuffs according to the second aspect of the invention are produced by reacting a 1-chloro-, 1-bromo- or 1-sulphonic acid- anthraquinone with an amine of the formula

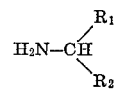

wherein $R_1$ and $R_2$ have the meanings given in Formula VIII, to form the corresponding 1-(sec-alkylamino)-anthraquinone, halogenating this to form the 1-(sec-alkylamino)-4-chloro- or -4-bromo-anthraquinone which is then reacted with an amine of the formula H$_2$N—A$_1$ wherein $A_1$ has the meaning given in Formula VIII, and then reacting the resulting 1,4-diaminoanthraquinone of formula

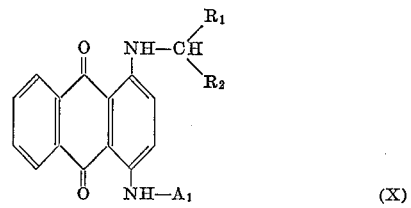

(X)

wherein $R_1$, $R_2$ and $A_1$ have the same meanings as in Formula VIII, which anthraquinones of Formula X are disperse dyes suitable for the dyeing of lacquers, with a sulfonating agent, preferably concentrated sulfuric acid or oleum of lower SO$_3$ content (about 1–2%), at room temperature (15–35° C.) for 6 to 24 hours, until monosulfonation is complete, which can be controlled by determining the solubility of samples in water, adjusted to a pH of 7.

The sulfonic acid group is attached to a carbon atom of a phenyl nucleus of A in Formula II or $A_1$ in the above Formula VIII. It will enter in ortho, meta- and para-position in proportions which depend on the absence or presence of substituents in that nucleus. The isomers thus constituting the dyestuffs falling under Formula III can be isolated by known chromatographic techniques and the position of the sulfonic acid group in each individual isomer could be determined by infrared and magneto-nuclear resonance spectra. However, since the isomers thus obtained would be of no superior dyeing properties and their isolation would be highly uneconomical, such separation would be without any technical value.

The term "lower" as used in this specification including the claims in connection with "alkyl" and "alkoxy" means that these radicals have from 1 to 4 carbon atoms. Sulphonation can also be performed with chorosulphonic acid in a solvent which does not take part in the reaction, e.g. in chlorobenzene or nitrobenzene.

The radical $A_1$ is preferably bound to the nitrogen by means of a carbon atom in the ring in p-position to the bridging member.

As diphenyl alkane radical, $A_1$ represents, e.g. the radical of a 1,1- or 1,2- diphenyl ethane, of a 2,2-diphenyl propane and, particularly, of a diphenyl methane; as diphenyl-cycloalkane radical, $A_1$ represents, e.g. the radical of a 1,1-diphenyl cyclohexane. Substituents in the diphenyl alkane, diphenyl cycloalkane, diphenyl ether and diphenyl thioether radical $A_1$ are mainly lower alkyl groups such as the methyl or ethyl group, lower alkoxy groups such as the methoxy or ethoxy group, and halogens up to the atomic number 35 such as fluorine, chlorine or bromine. If the radical $A_1$ is bound to the nitrogen by a ring carbon atom in p-position to the bridging member, then it can also contain a phenoxy group in o-position to the nitrogen bond.

Preferably $A_1$ represents the radical of a diphenyl ether radical bound to the nitrogen in p-position to the ether oxygen atom.

The lower alkyl groups in the positions of $R_1$ and $R_2$ have 1 to 6, preferably 1 to 4, carbon atoms. If these alkyl groups are substituted, then examples of substituents are the phenyl or the cyclohexyl group; preferably, however, they are unsubstituted.

The following non-limitative examples illustrate the invention further. The temperatures are given therein as degrees centigrade. Where not otherwise stated, parts and percentages are given by weight.

EXAMPLE 1

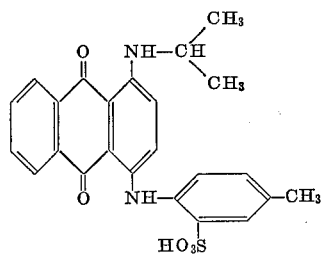

A mixture of 5 g. of technical anhydrous potassium acetate, 0.005 g. of copper-(I) chloride and 0.15 ml. of water is added to a 100° hot melt of 13.4 g. of 4-methylphenylamine and 17.2 g. of 1-isopropylamino-4-bromoanthraquinone. The whole is stirred for 24 hours at 100–102°. Then 100 ml. of 1 N hydrochloric acid are poured into this mixture whereupon the temperature drops to 80°. The mixture is stirred for some time at this temperature until the 1-isopropylamino - 4 - (4' - methylphenylamino)-anthraquinone has separated in a form which can easily be filtered off. It is then filtered off, first washed with 300 ml. of 1 N hydrochloric acid and then with 200 ml. of a mixture of 1 part of methanol and 1 part of 1 N-hydrochloric acid, then with water and finally again with hot and then with cold methanol.

After recrystallization from n-butanol, 1-isopropylamino-4-(4' - methylphenylamino)-anthraquinone is obtained in the form of fine, violet-blue needles which melt at 170°.

37 g. of 1-isopropylamino-4-(4'-methylphenylamino)-anthraquinone are dissolved in 370 g. of 6% oleum and the solution is stirred for 3 hours at about 25°. The same result is also obtained when using 5% oleum and stirring for 6 hours. The solution is then poured onto a mixture of ice and sodium chloride, the precipitate obtained is filtered off and washed with aqueous 10% sodium chloride solution. It is then slurried in water, the slurry is neutralized with sodium hydroxide solution, the whole is heated to 50° and sodium chloride is added whereupon the dyestuff of the above formula precipitates as the sodium salt. It is filtered off, washed and dried. The unchromatographed dyestuff thus obtained is used for commercial dyeing purposes. The presence of the corresponding meta-sulfonated isomeric dyestuff could not be detected in thin-layer chromatography.

From a weakly acid to acid bath, the dyestuff which is present in the bath in free acid form, dyes nylon or wool in a level, pure greenish blue shade which has good wet and light fastness.

By repeating Example 1, but using instead of the 1-isopropylamino-4-bromoanthraquinone mentioned above, equivalent amounts of one of the anthraquinone compounds listed below, then with otherwise the same procedure, dyestuffs having similar dyeing properties on nylon are obtained.

EXAMPLE 2

1-isopropylamino-4-chloroanthraquinone, obtained by chlorinating 1-isopropylamino anthraquinone.

EXAMPLE 3

1-sec-butylamino-4-bromoanthraquinone, obtained by brominating 1-sec-butylamino anthraquinone with elementarybromine in glacial acetic acid.

EXAMPLE 4

1-sec-butylamino-4-chloroanthraquinone, obtained by chlorinating 1-sec-butylamino anthraquinone.

EXAMPLE 5

1-isopropylamino-4-bromo-6-chloroanthraquinone, obtained by brominating 1-isopropylamino-6-chloroanthraquinone.

EXAMPLE 6

1 - isopropylamino-4-bromo-6,7-dichloroanthraquinone, obtained by brominating 1-isopropylamino-6,7-dichloroanthraquinone.

EXAMPLE 7

1-isopropylamino-4,6-dibromo-anthraquinone, produced by reacting 1-hydroxy-4,6-dibromo-anthraquinone or its leuco compound with isopropylamine in boiling ethanol.

EXAMPLE 8

1 - isopropylamino-4-chloro-6,7-dibromo-anthraquinone produced by chlorinating 1-isopropylamino-6,7-dibromo-anthraquinone.

If, instead of 4-methylphenylamine, one of the phenylamines given below is used in the amounts given and otherwise the procedure given in Example 1 is followed, and each of the starting anthraquinones listed in Examples 1 to 8 is used, respectively, then dyestuffs having similar good dyeing properties, especially on nylon, are obtained.

TABLE I

| | | | Monosulfonation with n percent oleum at 25° C. | | |
|---|---|---|---|---|---|
| | | | n percent | Position of —$SO_3H$ | |
| Ex. No. | Amount, g. | Phenylamine | | Main product | Side products |
| 9 | 14.0 | Phenylamine | 7 | 4 | |
| 10 | 13.4 | 2-methylphenylamine | 5 | 6 | 2, 4 |
| 11 | 13.4 | 3-methylphenylamine | 4.5 | 6 | 3, 5 |
| 12 | 15.0 | 2,4-dimethylphenylamine | 4 | 6 | 2, 5 |
| 13 | 15.0 | 3,4-dimethylphenylamine | 4.5 | 6 | |
| 14 | 15.0 | 2,5-dimethylphenylamine | 4 | 6 | |
| 15 | 15.0 | 2,3-dimethylphenylamine | 4.5 | 4 | |
| 16 | 15.0 | 2,6-dimethylphenylamine | 4.5 | 3 | |
| 17 | 17.0 | 2,4,6-trimethylphenylamine | 7 | 4 | |
| 18 | 15.0 | 2-ethylphenylamine | | 2 | |
| 19 | 15.0 | 4-ethylphenylamine | 5.5 | 2 | |
| 20 | 17.0 | 4-isopropylphenylamine | 5.5 | 4 | |
| 21 | 15.0 | 2-methoxyphenylamine | 4 | 4 | 5, 6 |

TABLE I—Continued

| Ex. No. | Amount, g. | Phenylamine | Monosulfonation with n percent oleum at 25° C. | | |
|---|---|---|---|---|---|
| | | | n percent | Position of —SO₃H | |
| | | | | Main product | Side products |
| 22 | 15.0 | 4-methoxyphenylamine | 4.5 | 2 | |
| 23 | 17.0 | 2-ethoxyphenylamine | 4.5 | 4 | |
| 24 | 17.0 | 4-ethoxyphenylamine | 5.5 | 2 | |
| 25 | 16.0 | 3-chlorophenylamine | 5.5 | 6 | 2, 4 |
| 26 | 16.0 | 4-chlorophenylamine | 5 | 2 | |
| 27 | 16.0 | 3-bromophenylamine | 5 | 6 | 2, 4 |
| 28 | 21.5 | 4-bromophenylamine | 5 | 2 | |
| 29 | 18.0 | 2-methyl-6-chlorophenylamine | 5.5 | 4 | |
| 30 | 18.0 | 3-chloro-4-methylphenylamine | 5.5 | 6 | |
| 31 | 20.0 | 3-trifluoromethylphenylamine | 7.8 | 6 | |
| 32 | 18.0 | 2,5-dimethoxyphenylamine | 3.5 | 6 | 3, 4 |
| 33 | 18.0 | 2,6-dimethoxyphenylamine | 2 | 4 | |
| 34 | 17.0 | 2-methoxy-5-methylpehnylamine | 5.5 | 6 | 4 |
| 35 | 19.0 | 2-methoxy-5-chlorophenylamine | 5 | 6 | 4 |
| 36 | 17.0 | 3-methoxy-4-methylphenylamine | 4.5 | 6 | 2 |
| 37 | 17.0 | 2-methyl-4-methoxyphenylamine | 4.5 | 6 | 3, 5 |
| 38 | 19.0 | 4-acetylaminophenylamine | 7 | 2 | |
| 39 | 22.5 | 3-methoxy-4-acetylaminophenylamine | 6 | 6 | |

Separation of the isomers noted above as side products, which could be achieved by known chromatographic methods, is of no commercial interest, since these isomers do not differ in their practical dyeing properties from the mixture thereof.

EXAMPLE 40

A mixture of 5 g. of technical anhydrous potassium acetate, 0.01 g. of copper-(I) chloride and 0.15 ml. of water is added to a 100° hot melt of 13.4 g. of 4-methylphenylamine and 19.3 g. of 1-(N-acetyl-N-isopropylamino)-4-bromoanthraquinone (M.P. 173–174°, obtained by reacting 1-isopropylamino - 4 - bromoanthraquinone with acetanhydride). The mixture is stirred for 24 hours at 100 to 102°. 100 ml. of 1 N hydrochloric acid and then 150 ml. of methanol are poured in and the whole is diluted with 200 ml. of 1 N hydrochloric acid whereupon the 1 - (N-acetyl-N-isopropyl-amino) - 4 - (4' - methylphenylamino)-anthraquinone precipitates. This is filtered off and washed with 1 N hydrochloric acid and then with a mixture of 1 part of methanol and 1 part of 1 N hydrochloric acid and finally with water and dried. After recrystallization from isopropanol, the product is obtained in the form of red needles which melt at 180°.

10 g. of the 1-(N-acetyl-N-isopropylamino)-4-(4'-methylphenylamino)-anthraquinone so obtained are dissolved in 35 ml. of concentrated sulphuric acid and the solution is stirred for 1 hour at 60–65°. The solution is then poured onto ice, the precipitate is filtered off and washed neutral. After drying and recrystallizing from n-butanol, a compound melting at 170° which is identical with the 1-isopropylamino-4-(4'-methylphenylamino)-anthraquinone mentioned in Example 1 is obtained.

This is sulphonated as described in Example 1.

If, instead of 1-(N-acetyl-N-isopropylamino)-4-bromoanthraquinone, there is used an equivalent amount of 1-(N-acetyl-N-isopropylamino) - 4 - chloroanthraquinone which is in turn obtained by reacting 1-isopropylamino-4-chloroanthraquinone with acetanhydride, and otherwise the same procedure is followed as in Example 40, then 1-(N-acetyl-N-isopropylamino)-4-(4'-methylphenylamino)-anthraquinone is obtained, M.P. 180°, and saponification of the latter leads to formation of 1-isopropylamino - 4 - (4'-methylphenylamino)-anthraquinone (M.P. 170°).

By using in the above example in lieu of 1-(N-acetyl-N-isopropyl-amino)-4-bromo-anthraquinone an equivalent amount of 1-(N-phenylsulfonyl-N-isopropyl-amino)-4-chloro-anthraquinone or 1-(N-phenylsulfonyl-N-isopropyl-amino)-4-bromo-anthraquinone and saponifying, in each case, 10 g. of the resulting N-phenyl-sulfonyl substituted intermediate by heating in 35 ml. of 80%- sulfuric acid at 55–60° for 8 hours, 1-isopropylamino-4-(4'-methylphenylamino)-anthraquinone is also obtained.

This is also the case when using in the above variant of Example 40 in lieu of the starting anthraquinones last mentioned, equivalent amounts of the corresponding 1-[N-(4'-methylphenylsulfonyl)-N-isopropylamino] - anthraquinones or 1-(N-methylsulfonyl-N-isopropylamino)-anthraquinones.

EXAMPLE 41

A mixture consisting of 17.3 g. of 1-chloro-4-(4'-methyl-phenylamino)-anthraquinone, 20 g. of isopropylamine, 5 g. of technical anhydrous potassium acetate, 0.005 g. of copper-(I) chloride, 0.2 ml. of water and 30 ml. of n-butanol is stirred for 24 hours at 120° in an autoclave. The hot mixture is then diluted with 40 ml. of methanol and, after cooling, the product which precipitates is filtered off. It is purified by recrystallisation from n-butanol. The 1-isopropylamino-4-(4'-methylphenylamino)-anthraquinone, which melts at 170°, is identical with the product of Example 1 and it is sulphonated as there described.

If, instead of the 1-chloro-4-(4'-methylphenylamino)-anthraquinone, an equivalent amount of the corresponding 1 - bromo-4-(4'-methylphenylamino)-anthraquinone compound is used, then with otherwise the same procedure, the same reaction product is obtained.

EXAMPLE 42

A mixture consisting of 19.4 g. of 1-chloro-4-[N-acetyl-N-(4'-methylphenyl)-amino]-anthraquinone, 40 ml. of n-butanol and 20 g. of isopropylamine is stirred for 24 hours at 145° in an autoclave. 40 ml. of methanol are added to the hot mixture which is then allowed to cool whereupon the 1 - isopropylamino - 4-[N-acetyl-N-(4'-methylphenyl)-amino]-anthraquinone which precipitates is filtered off.

10 g. of the product obtained are dissolved in 35 ml. of 80% sulphuric acid and the mixture is stirred for 8 hours at 55–60°. The solution is then poured onto ice, the precipitate is then filtered off and washed until it has a neutral reaction.

After drying and recrystallizing from n-butanol, the 1 - isopropylamino - 4-(4'-methylphenylamino)-anthraquinone described in Example 1 is obtained. It melts at 170°; it is sulphonated as described in Example 1.

When using, instead of 1 - chloro - 4 - [N-acetyl-N-(4'-methyl - phenyl) - amino] - anthraquinone, equivalent amounts of the corresponding bromine compound or of 1-chloro- or 1 - bromo - 4-[N-phenylsulphonyl-N-(4'-methylphenyl)-amino]-anthraquinone, 1-chloro- or 1-bromo - 4 - [N-(4'-methylphenylsulfonyl)-N-4'-methylphenyl)-amino]-anthraquinone, 1-chloro- or 1-bromo-4-[N-methylsulfonyl-N-(4'-methylphenyl)-amino] - anthraquinone or 1-chloro- or 1-bromo-4-[N-benzoyl-N-(4'-methylphenyl)-amino]-anthraquinone, and otherwise following the same procedure as outlined above in Example 42, the aforesaid 1-isopropylamino-4-(4'-methylphenylamino)-anthraquinone of M.P. 170° is also obtained.

EXAMPLE 43

A mixture of 13 g. of 1-hydroxy-4-(4'-methylphenylamino)-anthraquinone, 40 g. of phenol, 9 g. of zinc dust and 20 g. of isopropylamine is stirred for 24 hours at a temperature of 100° in an autoclave. After adding 50 ml. of 30% sodium hydroxide solution, the mixture is made strongly alkaline and diluted with 300 ml. of ethanol whereupon a weak stream of air is introduced into the mixture under reflux until the leuco compound is completely oxidized. The precipitated product is filtered off and is purified by recrystallization from n-butanol. The 1-isopropylamino-4-(4'-methylphenylamino)-anthraquinone described in Example 1 is obtained. It melts at 170°. It is sulphonated as described in Example 1.

If, instead of 1-hydroxy-4-(4'-methylphenylamino)-anthraquinone, an equivalent amount of 1-amino-4-(4'-methylphenylamino)-anthraquinone is used then, with otherwise the same procedure, the same reaction product is obtained.

EXAMPLE 44

A mixture of 34.3 g. of 1-methoxy-4-(4'-methylphenylamino)-anthraquinone, 150 ml. of n-butanol and 100 g. of isopropylamine is stirred for 24 hours at a temperature of 150° in an autoclave. After cooling, the precipitated product is filtered off and recrystallised from n-butanol. The 1-isopropylamino-4-(4'-methylphenylamino)anthraquinone described in Example 1 is obtained. It melts at 170° and is sulphonated as described in Example 1.

If, instead of the 1-methoxy-4-(4'-methylphenylamino)-anthraquinone mentioned above, the corresponding 1-nitro-anthraquinone compound is used then, with otherwise the same procedure, the same end product is obtained.

EXAMPLE 45

A mixture of 16.0 g. of 1,4-dihydroxy-anthraquinone, 8.2 g. of leuco-1,4-dihydroxy-anthraquinone, 6 g. of ortho-boric acid and 12.7 g. of 4-methylphenylamine is stirred with 100 ml. of ethanol for 12 hours at a temperature of 78°. Without isolating the 1-hydroxy-4-(4'-methylphenylamino)-anthraquinone formed, a solution of 25 g. of isopropylamine in 50 ml. of n-butanol is added to the reaction mixture and the whole is stirred in an autoclave for 12 hours at a temperature of 100°. After cooling, the precipitated product is filtered off and washed first with methanol, then with hot 1 N hydrochloric acid and finally with water until the washing filtrate has a neutral reaction. After drying, a blue powder is obtained from which pure 1-isopropyl-amnio-4-(4'-methylphenylamino)-anthraquinone can be obtained by chromatography on an aluminum oxide column and then recrystallization from n-butanol.

The blue powder is sulfonated as described in Example 1.

EXAMPLE 46

A mixture of 15.4 g. of 1-isopropylamino-4-hydroxy-anthraquinone, 40 g. of phenol, 9 g. of zinc dust and 36 g. of 4-methylphenylamine is stirred for 24 hours at a temperature of 100°. The mixture is made strongly alkaline by the addition of 50 ml. of aqueous 30% sodium hydroxide solution, it is diluted with 300 ml. of ethanol and, to complete the oxidation of the leuco compound, a weak air stream is passed through the mixture. The precipitated product is filtered off and purified by recrystallization from n-butanol. 1-isopropylamino-4-(4'-methylphenylamino)-anthraquinone described in Example 1 is obtained, M.P. 170° This is sulphonated as described in Example 1.

If, instead of 1-isopropylamino - 4 - hydroxy-anthraquinone, an equivalent amount of 1-isopropylamino-4-methoxy- or -4-nitro- or -4-amino-anthraquinone is used then, with otherwise the same procedure, the same reaction product is obtained.

EXAMPLE 47

A bath is prepared containing 0.5 g. of Glauber's salt, 0.4 g. of acetic acid and 0.2 g. of sulphonated 1-isopropylamino-4-(4'-methylphenylamino) - anthraquinone according to Example 1 in 500 ml. of water. 10 g. of wool flannel are introduced at 40° whereupon the temperature is evenly raised to the boil within half an hour and the flannel is dyed for 1 hour at the boil. The dyed goods are then rinsed and finished in the usual way. A very level pure greenish blue dyeing is obtained.

If, instead of acetic acid in the above example, the same amount of sulphuric acid is used, then a dyeing having similar properties is obtained.

EXAMPLE 48

3 g. of sulphonated 1-isopropylamino-4-(4'-methylphenylamino)-anthraquinone according to Example 1, in the form of the sodium salt, are dissolved in 5000 ml. of water and 2.5 g. of sulphonated ricinoleic acid butyl ester, 2.5 g. of formic acid (85%) and 0.2 g. of sulphuric acid (96%) are added. 100 g. of synthetic polyamide fabric are introduced into the dyebath at 50°. The bath is then brought to the boil within half an hour and kept at the boil for 1 hour. The fabric is then rinsed with warm and cold water and dried. The greenish-blue dyeing obtained has good fastness to light and washing.

EXAMPLE 49

(a) 45 g. of 4-amino-4'-methyldiphenyl ether, 34.4 g. of 1-isopropylamino-4-bromoanthraquinone and 10 ml of ethylene glycol monoethyl ether are placed in a flask fitted with a stirrer and the mixture is heated to 100° whereupon a red melt is obtained. 9.90 g. of anhydrous potassium acetate, 0.01 g. of cuprous chloride and 0.2 ml. of water are added and the whole is stirred for 20 hours at a temperature of 100–102° while passing a stream of nitrogen over the surface of the melt. 160 ml. of normal aqueous hydrochloric acid heated to 90° are then poured into the mixture and the whole is stirred for some time at 85° until the end product separates in crystalline form. This is filtered off at 80°, washed with hot normal aqueous hydrochloric acid and then with water until the filtrate has a neutral reaction and finally with methanol. After drying, a crude product is obtained as a blue powder which is further purified by recrystallization from n-butanol. The pure dyestuff which corresponds to the formula

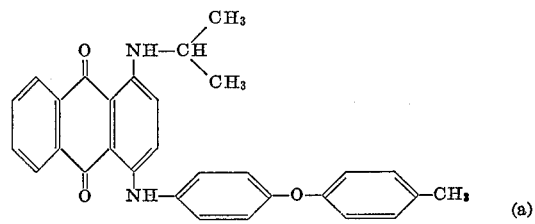

(a)

is thus obtained as needles having a metallic shimmer. It melts at 172°, and can be used as disperse dye in lacquers.

10 g. of the 1,4-diaminoanthraquinone of Formula (a) are added to 100 g. of sulfuric acid monohydrate, the solution obtained is stirred for 8 hours at a temperature of 23–25°, the mixture is then poured onto ice and the precipitate obtained is filtered off and washed with aqueous 10% sodium chloride solution. It is neutralized by suspending the filter residue in water and adding dilute sodium hydroxide solution thereto until the pH of the mixture is 7. The dyestuff is precipitated in the form of the sodium salt by the addition of sodium chloride; it is filtered off and dried at 90°.

The new dyestuff corresponds in its free acid form to the formula:

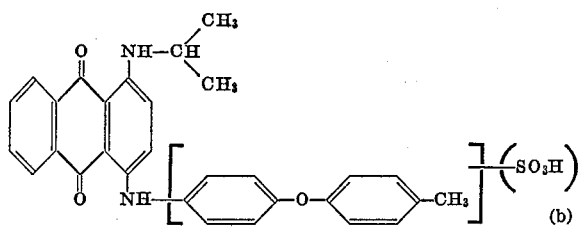

It is a blue powder which dissolves in water with a greenish blue colour. This dyestuff dyes nylon from a weakly acid bath at 130° C. in a pressure dyeing apparatus for 30 minutes. The greenish blue dyeings obtained have good wash fastness and fastness to alkaline perspiration.

Migration under these dyeing conditions is excellent.

While it is possible to isolate the isomers constituting the above dyestuff by known chromatographic techniques, and to identify the position of the sulfonic acid group in each isomer from its magneto-nuclear resonance spectrum, such further workup will not lead to products of improved properties, and is, moreover, highly uneconomical, so that it is of no practical value.

If oleum having 2–5% content of $SO_3$ is used for the sulphonation instead of sulphuric acid monohydrate, then with otherwise the same procedure a dyestuff having about 1.3 sulfonic acid groups per molecule and similar valuable dyeing properties on wool is obtained.

If with otherwise the same procedure, instead of the 1,4-diaminoanthraquinone of Formula (a) given above, an equivalent amount of a 1,4-diaminoanthraquinone is used which is obtained by condensation of one of the 1-(sec-alkylamino)-4-halogenanthraquinones given in column I of the following Table II with an amino-diphenyl ether, aminodiphenyl thioether, amino-diphenyl alkane or aminodiphenyl cycloalkane given in column II of Table II, then dyestuffs having similar properties are obtained.

TABLE II

| Ex. No. | I | II | Wool dyeings |
|---|---|---|---|
| 50 | [1-(sec-butylamino)-4-bromoanthraquinone structure] | $H_2N$—⌬—O—⌬ | Greenish blue. |
| 51 | Same as above | $H_2N$—⌬—O—⌬—$C_2H_5$ | Do. |
| 52 | do | $H_2N$—⌬—O—⌬—CH($CH_3$)$_2$ | Do. |
| 53 | do | $H_2N$—⌬—O—⌬—C($CH_3$)$_3$ | Do. |
| 54 | do | $H_2N$—⌬—O—⌬—$CH_2$—C($CH_3$)$_3$ | Do. |
| 55 | do | $H_2N$—⌬—O—⌬ | Do. |
| 56 | do | $H_2N$—⌬(—O—⌬) | Do. |
| 57 | do | $H_2N$—⌬($CH_3$)$_2$—O—⌬ | Reddish blue. |
| 58 | do | $H_2N$—⌬($CH_3$)$_2$—O—⌬—$CH_3$ | Do. |
| 59 | do | $H_2N$—⌬($CH_3$)(O—⌬) | Do. |

TABLE II—Continued

| Ex. No. | I | II | Wool dyeings |
|---|---|---|---|
| 60 | Same as Ex. 59 | 2,5-dimethyl-4-phenoxyaniline (H₂N–C₆H₂(CH₃)₂–O–C₆H₅) | Reddish blue. |
| 61 | do | 4-chloro-2-phenyl-aniline (H₂N–C₆H₃(Cl)–C₆H₅) | Blue. |
| 62 | do | 3,5-diphenoxyaniline (H₂N–C₆H₃(OC₆H₅)₂) | Do. |
| 63 | 1-isopropylamino-4-chloroanthraquinone | 4-(4-tert-butylphenoxy)aniline (H₂N–C₆H₄–O–C₆H₄–C(CH₃)₃) | Greenish blue. |
| 64 | 1-(sec-butylamino)-4-bromoanthraquinone | 4-(4-methylphenoxy)aniline (H₂N–C₆H₄–O–C₆H₄–CH₃) | Do. |
| 65 | Same as above | 4-(4-chlorophenoxy)aniline (H₂N–C₆H₄–O–C₆H₄–Cl) | Do. |
| 66 | do | 4-(4-tert-butylphenoxy)aniline (H₂N–C₆H₄–O–C₆H₄–C(CH₃)₃) | Do. |
| 67 | do | 2,6-dimethyl-4-phenoxyaniline (H₂N–C₆H₂(CH₃)₂–O–C₆H₅) | Reddish blue. |
| 68 | 1-(1-ethylpropylamino)-4-bromoanthraquinone | 4-phenoxyaniline (H₂N–C₆H₄–O–C₆H₅) | Greenish blue. |
| 69 | Same as above | 4-(4-methylphenoxy)aniline (H₂N–C₆H₄–O–C₆H₄–CH₃) | Do. |
| 70 | do | 4-(4-chlorophenoxy)aniline (H₂N–C₆H₄–O–C₆H₄–Cl) | Do. |

TABLE II—Continued

| Ex. No. | I | II | Wool dyeings |
|---|---|---|---|
| 71 | 1-(sec-pentyl-amino)-4-bromoanthraquinone [1-NH-CH(CH₃)-CH₂-CH₂-CH₃, 4-Br] | H₂N–C₆H₄–O–C₆H₅ | Greenish blue |
| 72 | Same as above | H₂N–C₆H₄–O–C₆H₄–CH₃ | Do. |
| 73 | do | H₂N–C₆H₄–O–C₆H₄–Cl | Do. |
| 74 | 1-NH-CH(CH₃)-CH(CH₃)-CH₃, 4-bromoanthraquinone | H₂N–C₆H₄–O–C₆H₅ | Do. |
| 75 | Same as above | H₂N–C₆H₄–O–C₆H₄–CH₃ | Do. |
| 76 | do | H₂N–C₆H₄–O–C₆H₄–Cl | Do. |
| 77 | 1-NH-CH(CH₃)-CH₂-CH(CH₃)-CH₃, 4-bromoanthraquinone | H₂N–C₆H₄–O–C₆H₅ | Do. |
| 78 | Same as above | H₂N–C₆H₄–O–C₆H₄–CH₃ | Do. |
| 79 | do | H₂N–C₆H₄–O–C₆H₄–Cl | Do. |
| 80 | 1-NH-CH(CH₃)-CH₂-CH₂-CH₂-CH(CH₃)-CH₃, 4-bromoanthraquinone | H₂N–C₆H₄–O–C₆H₅ | Do. |
| 81 | 1-NH-CH(CH₂CH₃)-CH₂-O-CH(CH₃)-CH₂-CH₃, 4-bromoanthraquinone | H₂N–C₆H₄–O–C₆H₅ | Do. |
| 82 | 1-NH-CH(CH₃)-CH(CH₃)-CH₂-CH₂-CH₂-CH₃, 4-bromoanthraquinone | H₂N–C₆H₄–O–C₆H₅ | Do. |

TABLE II—Continued

| Ex. No. | I | II | Wool dyeings |
|---|---|---|---|
| 83 | 1-(isopropylamino)-4-bromoanthraquinone | H₂N—C₆H₄—S—C₆H₅ | Greenish blue. |
| 84 | Same as above | H₂N—C₆H₄—S—C₆H₄—CH₃ | Do. |
| 85 | do | H₂N—C₆H₄—S—C₆H₄—Cl | Do. |
| 86 | 1-(sec-butylamino)-4-bromoanthraquinone | H₂N—C₆H₄—S—C₆H₅ | Do. |
| 87 | Same as above | H₂N—C₆H₄—S—C₆H₄—CH₃ | Do. |
| 88 | do | H₂N—C₆H₄—S—C₆H₄—Cl | Do. |
| 89 | 1-(isopropylamino)-4-bromoanthraquinone | H₂N—C₆H₄—CH₂—C₆H₅ | Do. |
| 90 | 1-(isobutylamino)-4-bromoanthraquinone | H₂N—C₆H₄—CH₂—C₆H₄—CH₃ | Do. |
| 91 | Same as above | H₂N—C₆H₃(OCH₃)—CH₂—C₆H₅ | Do. |
| 92 | do | H₂N—C₆H₄—CH₂—C₆H₄—Cl | Do. |
| 93 | do | H₂N—C₆H₃(CH₃)—CH₂—C₆H₅ | Do. |
| 94 | do | H₂N—C₆H₃(CH₃)—CH₂—C₆H₂(CH₃)(CH₃) | Do. |
| 95 | do | H₂N—C₆H₄—CH₂—C₆H₃(CH₃)(CH₃) | Do. |

TABLE II—Continued

| Ex. No. | I | II | Wool dyeings |
|---|---|---|---|
| 96 | Same as Ex. 95 | H₂N–C₆H₄–CH₂–C₆H₃(CH₃)(CH₃) (2,5-dimethylbenzyl aniline) | Greenish blue. |
| 97 | 1-(isopropylamino)-4-bromoanthraquinone | H₂N–C₆H₃(CH₃)–CH(CH₃)–C₆H₅ (4-methyl-2-benzyl aniline) | Do. |
| 98 | 1-(isopropylamino)-4-bromoanthraquinone | H₂N–C₆H₂(CH₃)(CH₃)–CH₂–C₆H₅ (2,6-dimethyl-4-benzyl aniline) | Reddish blue. |
| 99 | 1-(sec-butylamino)-4-bromoanthraquinone | H₂N–C₆H₄–CH₂–C₆H₅ | Greenish blue. |
| 100 | 1-(sec-butylamino)-4-bromoanthraquinone | H₂N–C₆H₃(CH₃)–CH₂–C₆H₅ | Do. |
| 101 | 1-(sec-butylamino)-4-bromoanthraquinone | H₂N–C₆H₃(CH₃)–CH₂–C₆H₅ (4-methyl-2-benzyl aniline) | Do. |
| 102 | 1-(2-methylbutylamino)-4-bromoanthraquinone | H₂N–C₆H₄–CH₂–C₆H₅ | Do. |
| 103 | 1-(sec-pentylamino)-4-bromoanthraquinone | H₂N–C₆H₃(CH₃)–CH₂–C₆H₅ | Do. |

TABLE II—Continued
| Ex. No. | I | II | Wool dyeings |
|---|---|---|---|
| 104 | Same as Ex. 103 | 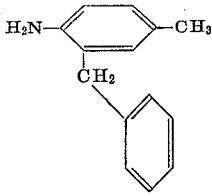 | Greenish blue. |
| 105 | 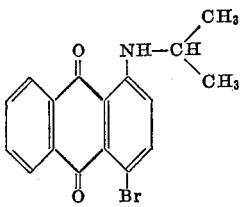 | 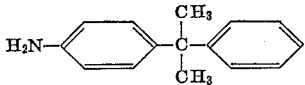 | Do. |
| 106 | Same as above | 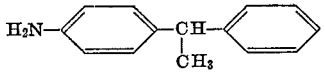 | Do. |
| 107 | do | 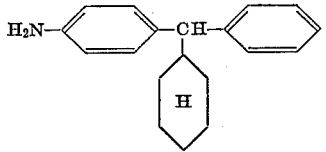 | Do. |
| 108 | 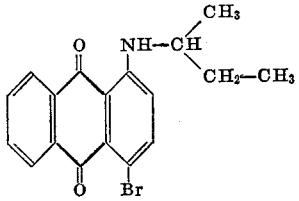 | 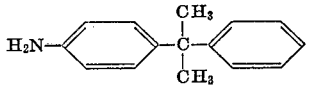 | Do. |
| 109 | Same as above | 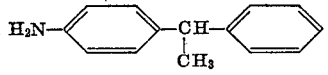 | Do. |
| 110 | do | 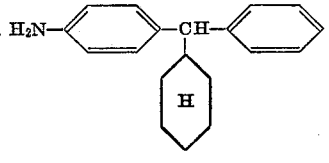 | Do. |
| 111 | 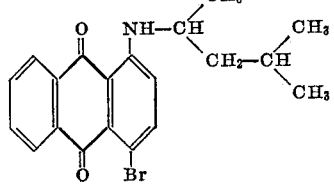 | 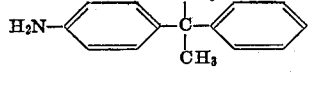 | Do. |
| 112 | Same as above | 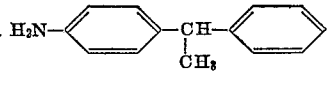 | Do. |
| 113 | 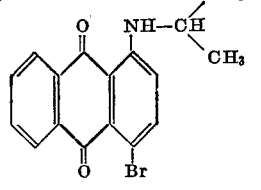 | 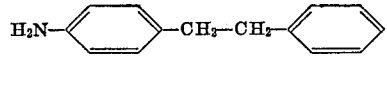 | Do. |

TABLE II—Continued

| Ex. No. | I | II | Wool dyeings |
|---|---|---|---|
| 114 |  |  | Greenish blue. |

The 1 - (sec-alkylamino)-4-halogen anthraquinones given in column I of Table II are obtained by brominating or chlorinating the corresponding 1-(sec-alkylamino)-anthraquinones with elementary bromine or with sulfuryl chloride in a solvent which does not take part in the reaction, e.g. o - dichlorobenzene or nitrobenzene. The 1-(sec-alkylamino)-anthraquinones are produced in their turn by reacting 1-chloro- or 1-bromo-anthraquinone with the corresponding sec-alkylamine at 140–150°, if necessary in an autoclave.

EXAMPLE 115

24 g. of 1,4-diaminoanthraquinone of the formula:

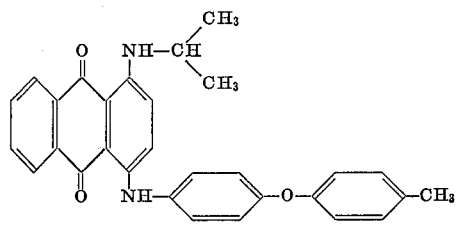

are added to 200 ml. of dry nitrobenzene at 25° while stirring 20 g. of chlorosulphonic acid are added and then the whole is stirred for 18 hours at 23–25°. 200 ml. of water are added to this mixture carefully while cooling, then sodium hydroxide solution is added to the mixture until it has a weakly alkaline reaction whereupon the nitrobenzene is removed by steam distillation. The dyestuff is then salted out with sodium chloride, filtered off and washed with 10% sodium chloride solution until the washing water is neutral. After drying at 90°, the dyestuff is obtained as a blue powder. It is identical to the sulfonated dyestuff of Example 49.

EXAMPLE 116

100 g. of wool flannel are entered into a 40–45° warm dyebath which contains 2 g. of the sulfonated dyestuff of Example 49, 5 g. of ammonium acetate and 10 g. of sodium sulphate in 3000 ml. of water. The bath is evenly brought to a light boil within 30 minutes and kept at the boil for another 30 minutes. A greenish blue wool dyeing is obtained which has good wet fastness properties.

EXAMPLE 117

10 kg. of nylon-66 fabric "Nyltest" are introduced into a beam-dyeing machine, containing in 200 liters of water 100 g. dyestuff according to Example 50 which corresponds to the formula

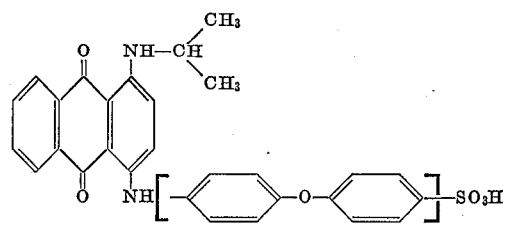

300 g. of 85% formic acid and 200 g. of the sodium salt of the acid sulfuric acid ester of butyl ricinoleate. The apparatus is closed and gradually heated within 30 minutes to 130°, whereupon dyeing is performed during 30 minutes at that temperature. After cooling, the fabric is withdrawn from the machine, rinsed first with warm and then with cold water and dried. There is obtained a very level, brilliant greenish-blue dyeing, showing good fastness to washing, to perspiration and to light.

These requirements are fully met by dyestuffs pertaining to the second aspect of the present invention. Moreover these new dyestuffs yield dyeings on the above-mentioned polyamide and blended fiber materials which are distinguished by specially outstanding wet fastness properties and brilliancy, especially including green shades obtained by mixture with neutral-drawing yellow dyes from other dyestuff classes.

Blended fiber materials contain besides the polyamide fibers, cellulosic fibers such as cotton, cellulose acetate including cellulose triacetate, polyethyleneglycol-terephthalate fiber or the like.

The new dyes according to this aspect of the invention are distinguished apart from fulfilling the requirements explained in the foregoing, by excellent level drawing property on the above-mentioned polyamide blended fibers, and by satisfactory to very good light fastness of the resulting dyeings on these fibers, even in green shades obtained by using the above-mentioned mixtures of the new dyes with suitable neutral-drawing yellow dyes.

Yellow dyes which draw from a neutral bath on the above-mentioned fibers and are particularly suitable for mixture with the neutral-drawing anthraquinone dyes according to the second aspect of the invention are those of the following classes: benzene-azo-pyrazolone dyes, benzene-azo-imino-pyrazole dyes, pyrazolone-azo-arylene-azo-pyrazolone dyes or imino-pyrazole-azo-arylene-azo-iminopyrazole dyes.

We claim:

1. A monosulfonated dyestuff which in free acid form is of the formula

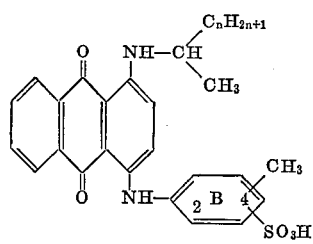

wherein $n$ represents 1 or 2.

2. A dyestuff as defined in claim 1, wherein the methyl substituent at ring B is in 4-position, and the sulfo group is in 2-position in said ring.

3. A dyestuff as defined in claim 1, wherein the methyl substituent at ring B is in 4-position and the sulfo group is in 2-position at said ring, and $n$ is 1.

References Cited

UNITED STATES PATENTS

| | | | |
|---|---|---|---|
| 687,658 | 11/1901 | Schmidt | 260—374 |
| 2,166,353 | 7/1939 | Heslop et al. | 260—374 |

LORRAINE A. WEINBERGER, Primary Examiner

HAROLD C. WEGNER, Assistant Examiner

US. Cl. X.R.

8—39; 260—372, 377, 378, 381